March 24, 1964     M. ORAIN     3,125,870

UNIVERSAL JOINT FOR TRANSMISSION OF ROTATIONAL MOVEMENTS

Filed June 19, 1961     2 Sheets-Sheet 1

INVENTOR.
MICHEL ORAIN
BY Baldwin + Hight
ATTORNEYS

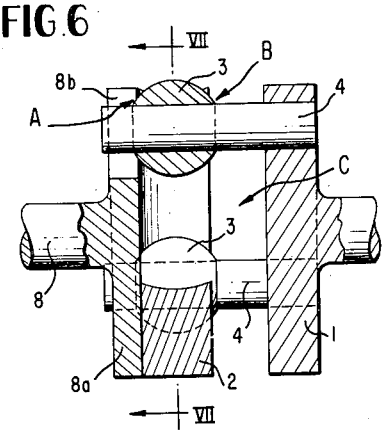
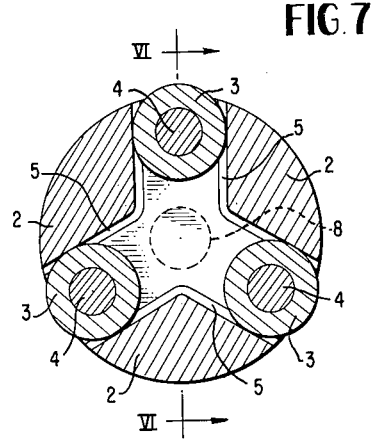
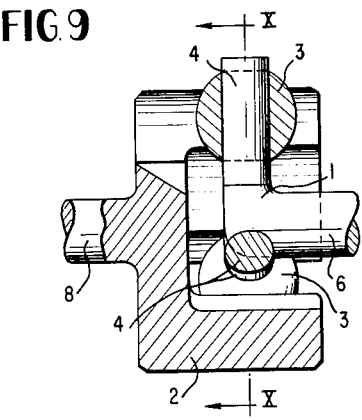
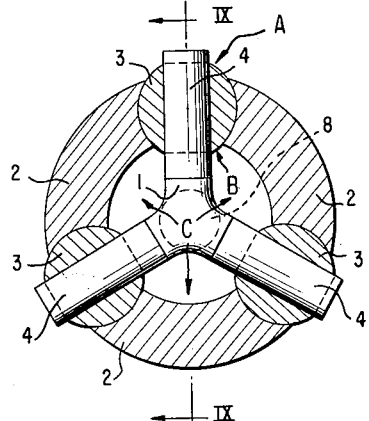

United States Patent Office 3,125,870
Patented Mar. 24, 1964

3,125,870
UNIVERSAL JOINT FOR TRANSMISSION
OF ROTATIONAL MOVEMENTS
Michel Orain, Courbevoie, Seine, France, assignor to Glaenzer Spicer Societe Anonyme, Poissy, France, a corporation of France
Filed June 19, 1961, Ser. No. 118,050
Claims priority, application France July 4, 1960
18 Claims. (Cl. 64—7)

The present invention relates to a universal joint for the transmission of rotational movements.

The invention has especially for its object to provide a universal joint intended to transmit the movement of rotation of a driving shaft to a driven shaft, these two shafts forming between each other a fixed or variable angle which may attain 60°, without any change in the instantaneous speed of rotation.

It has already been proposed to produce such joints by means of driving members fixed to either the driving shaft or the driven shaft, the said members being constituted by three rigid pivots, the axes of which are located in planes passing through the axis of the said shaft and forming between them angles substantially equal to 120° on which pivots there are mounted in free rotation, with or without freedom of axial sliding, spherical or substantially spherical coupling pieces, each of the said spherical pieces being engaged between flat surfaces parallel to each other and to a plane passing through the axis of the other shaft and formed on a portion rigidly fixed to the said other shaft.

However, such arrangements have disadvantages, both as regards the maximum limits of the torque to be transmitted and the centering of the joint, especially in the case when it is desired that the driving and driven shafts should form a substantial angle between them.

In accordance with the invention, these disadvantages are remedied by giving to each of the surfaces co-operating with the substantially spherical coupling pieces the shape of a gutter having a section substantially in an arc of a circle with a diameter equal to or slightly greater than that of the said pieces.

The coupling pieces are thus imprisoned between two surfaces of generally cylindrical form, the generator lines of which may be either rectilinear and may extend parallel, obliquely or perpendicularly to the axis of the shaft to which the said surfaces are coupled, or in arcs of circles centered or not on the said axis.

These coupling pieces are thus positively guided so as to swivel on their pivots during the rotation of the driving and driven shafts when the latter form a certain angle between each other, which confers a very important advantage as regards lubrication, by reason of the fact of the pumping effect resulting from the to-and-fro movement of the spherical pieces on their pivots. Furthermore, the contact between the spherical pieces and the surfaces with which they co-operate takes place, not at a point as was the case when the said surfaces were flat, but substantially along an arc of a circle, which enables the torque transmitted by the joint to be increased by an appreciable amount. This increase is still further facilitated by reason of the improvement in lubrication already referred to above.

The pivots of the first driving member may be parallel, oblique or perpendicular with respect to the axis of the corresponding shaft. They may radiate from that shaft, or they may be fixed to a plate fast with this latter, or again they may be mounted on a member in the form of a bell, rigidly fixed to the said shaft so as to be directed towards a common point located on the axis of this latter.

In order to prevent relative axial movements between the driving and driven shafts and to permit, when so required, tractive efforts on the joint according to the invention, a member with a spherical surface may be formed at the point of convergence of the pivots and may be mounted between abutment members fixed to the shaft which carries the above-mentioned pairs of surfaces, and the surfaces of which co-operating with the said spherical member are perpendicular to the axis of the said shaft.

A number of forms of embodiment of the universal joint forming the object of the present invention are described below by way of simple examples without any implied limitation, reference being made to the accompanying drawings, in which:

FIG. 6 shows in cross-section along the line VI—VI of FIG. 7 a fourth form of embodiment of the joint;

FIG. 7 is a cross-section along the line VII—VII of FIG. 6;

FIG. 8 shows in cross-section a fifth form of embodiment of the joints;

FIG. 9 shows a sixth form of construction in cross-section taken along the line IX—IX of FIG. 10;

FIG. 10 is a cross-section along the line X—X of FIG. 9.

Figure 1:
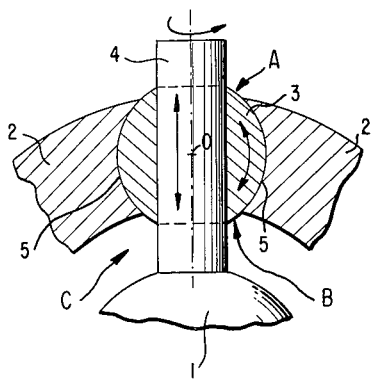
FIG. 1 is a diagrammatic view in cross-section illustrating the principle of the method of coupling of the elements of the joint.

The universal joint forming the object of the invention comprises essentially a first driving member 1 (FIG. 1) solid with or fixed to one of the two shafts to be coupled, a second driving member 2 solid with or fixed to the other shaft to be coupled and intermediate elements 3 intended to couple together the driving members 1 and 2.

The member 1 carries three pivots 4 arranged so as to form between them angles of 120° and each receiving an intermediate element 3 constituted by a spherical or substantially spherical piece drilled with a diametral bore enabling it to be passed over the corresponding pivot 4.

The member 2 comprises three pairs of grooves 5 the active surfaces of which face each other and are machined in such manner that the elements 3 can roll on them while remaining imprisoned, over arcs comprised between 60° and 90°. In the plane of FIG. 1, the grooves have a centre of symmetry, and the only necessity for the corresponding pivot 4 is that its axis should pass through this point. The freedom of the triangle formed by the three pivots 4 with respect to the second driving member 2 is thus obtained by the rotation and sliding of the spherical members 3 on the pivots, and by rotation of the said members about the centre of symmetry of the grooves 5 which correspond to and imprison them.

In addition, each pair of grooves defines two oppositely disposed open segments indicated in the figures at A and B. The two open segments, as will be apparent from the detailed explanation of the embodiments, extend along at least a substantial part of the length, and usually along the entire or nearly entire length, of the grooves, and can receive either the extremity of the corresponding pivot 4, as shown in FIGURES 1, 2, 3, 5, 6, 7, 8, 9 and 10, or the pivot means for passage between the pair of grooves, as shown in FIGURE 4. In the different embodiments of the invention, segment A is exterior and segment B is interior. Thus, the open segment B communicates with a spacing provided in each of the embodiments of the joint, and indicated generally at C. This spacing C may be a channel provided between the driving members 1 and 2, as in the embodiments of FIGURES 2, 3, 4, 6 and 7, or it may be a cavity in the driving member 2, as in the embodiments of FIGURES 5, 8, 9, and 10.

The radius of each intermediate element 3 should of course be substantially the same as that of the working surfaces of the grooves 5, and the distance between the bottoms of the grooves of the same pair which constitute a rolling and sliding path should be substantially equal to the diameter of the element 3.

An assembly of this kind thus permits the three pivots 4 each provided with an intermediate element 3 to be inserted in the grooves of the member 2 and to move therein freely according to the relative inclinations of the two shafts to be coupled together.

The forms of construction of such a joint may be numerous and some of these constructions are described below by way of examples only.

Figure 2:
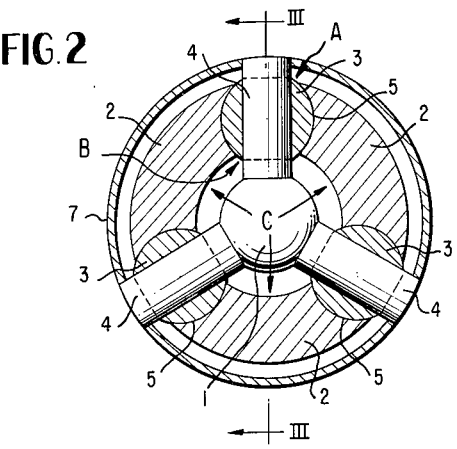
FIG. 2 shows diagrammatically in cross-section along the line II—II of FIG. 3 a first form of construction of the joint.
Figure 3:
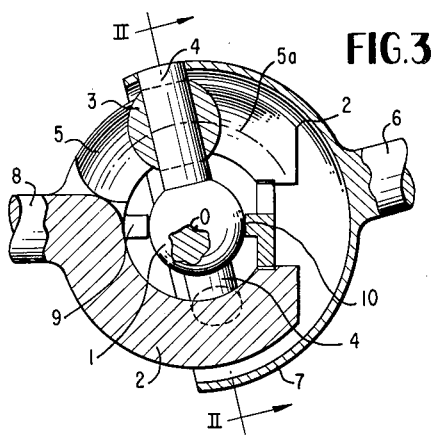
FIG. 3 is a cross-section along the line III—III of FIG. 2.
Figure 4:
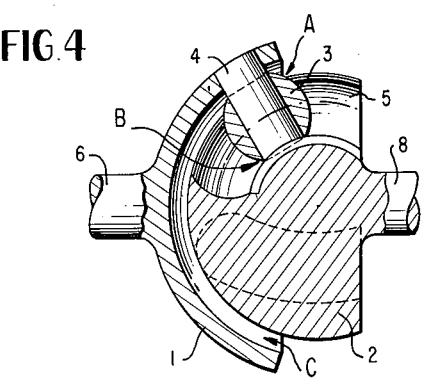
FIG. 4 shows diagrammatically in cross-section a second form of construction of the joint.

In a first form of construction shown in FIGS. 2 and 3, the driving member 1 is constituted by a spherical core on which are fixed three pivots 4 each carrying an intermediate element 3 of substantially spherical shape. The coupling of the first member 1 with one of the shafts 6, driving or driven, which are to be coupled together, is effected by the intermediary of a dome 7 which receives the extremities of the pivots 4.

The other shaft 8 is terminated by a member 2 of generally spherical external shape, provided with grooves 5, of which the line of centres 5a is circular.

Abutments 9 and 10 fixed to the driving member 2 are arranged in the example shown so as to bear on the central core 1 of spherical form, and prevent relative axial movements of the two shafts 6 and 8.

In the alternative form of construction shown in FIG. 4, the member 1 rigidly fixed to the shaft 6, has the form of a dome carrying the pivots 4 obliquely with respect to its axis, and the member 2 which is rigidly fixed to the shaft 8, is of spherical shape. In this member 2 are formed pairs of grooves 5 preferably arranged at 120° from each other and having circular lines of centres in which the intermediate prisoner elements 3 are able to move. It should be observed that in this alternative form, the three pivots 4 do not physically constitute a triangle and that this arrangement can be extended to all kinds of figures.

Figure 5:
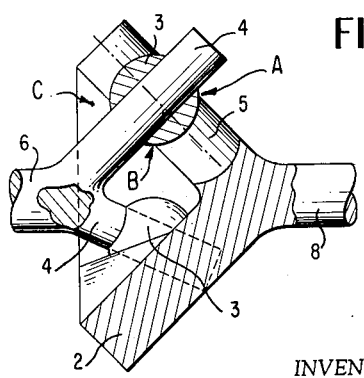
FIG. 5 represents a third form of embodiment of the joint.

FIG. 5 shows a further alternative form in which the member 1, fixed to the shaft 6, is constituted by a core carrying three oblique pivots 4 which make an angle of 45° with its axis.

The member 2, rigidly fixed to the shaft 8, has the shape of a conical funnel comprising grooves 5 arranged at 120° from each other and having rectilinear lines of centres also inclined at 45° to the axis of the said member. The intermediate elements 3 slide and roll while imprisoned in the grooves 5. It is quite obvious that the inclination of the pivots and the grooves may be different from that indicated above by way of mere example.

In the form of embodiment shown in FIGS. 6 and 7, the member 1 fixed to the shaft 6 is constituted by a plate on which the pivots 4 are fixed at 120° from each other, and parallel to the axis of the shaft 6. The member 2 is also constituted by a plate fixed to a plate 8a which terminates the shaft 8. In the plate 2 are formed three grooves 5 of circular section and preferably disposed at 120° from each other. The elements 3 mounted on the pivots 4, can roll and slide along the said grooves following the relative inclinations of the two shafts 6 and 8. The plate 8a is provided with ports 8b permitting the passage of the extremities of each of the pivots 4.

FIG. 8 represents a coupling in which the member 1 carries three pivots 4 arranged perpendicularly to the axis of the shaft 6 which is coupled to these latter by a cup 7'.

The member 2 is constituted by a cylindrical hub in which are formed at 120° from each other, cylindrical circular or substantially circular grooves 5, parallel to the axis of the shaft 8 which is rigidly fixed to the said member. Optional abutments 11 and 12 may be formed on the member 2 to prevent relative axial displacements of the two shafts 6 and 8, and supported on the spherical surface of the core 1 which constitutes the first driving member.

In a further form of construction shown in FIGS. 9 and 10, the member 1 is formed by a star carrying the pivots 4 perpendicular to the axis of the shaft 6.

The member 2 is constituted by a cylindrical cup solid with or rigidly fixed to the shaft 8. In the wall of the said cup are formed grooves 5 at 120° from each other and being of substantially circular section arranged parallel to the axis of the shaft 8.

In these various forms of construction, it can be seen that at any moment, and irrespective of the relative angular positions of the two shafts 6 and 8, the three axes of the pivots 4 of the first driving member 1 each cut one of the three lines of centres of the pairs of grooves 5 in which the second element 2 rolls and slides. Furthermore, the lines of contact of the spherical or almost spherical surfaces of the intermediate elements 3 with the grooves 5 may extend over the entire length of the bearing surfaces of these rolling surfaces.

It will further be noted that the intermediate elements 3 have a single imposed position which is independent of the speed of the coupled shafts, of the torque transmitted and of the direction of the torque.

In addition, it will be seen that in the forms of embodiment shown in FIGS. 5, 6 and 9 (and also in FIG. 8 if the optional abutments 11 and 12 are eliminated), the longitudinal displacement of one of the shafts with respect to the other is made possible, in combination with the rotation of the joint or without such rotation.

It should be noted that the forms of construction shown on the one hand in FIG. 8 and on the other in FIGS. 9 and 10, are different by reason of the different coupling of the pivots with the corresponding shaft, but it may be more advantageous to utilize one solution or the other, depending on the clearances desired and in order to make the members work more or less effectively under the action of the torques to be transmitted.

It is to be observed that the coupling of the pivots 4 to each other by a dome or other means when their free extremities pass through to the exterior of the member 2, enables the pivots either to be fixed to the shaft 6, as in FIG. 8, or the said pivots to be reinforced, as would be possible to achieve for example in the form of construction shown in FIGS. 9 and 10.

Finally, by associating two universal joints according to the invention, it is possible by virtue of appropriate particular arrangements, to form a coupling unit which permits a large angular displacement between the two coupled shafts.

It will be understood that the forms of construction above described have only been given by way of examples and not in any limitative sense, and that it will be possible to make modifications of form and detail without thereby departing from the scoop of the present invention.

What I claim is:

1. A universal joint for the transmission of rotational movements between two shafts, comprising a first driving member coupled to one of said two shafts; three pivot means rigidly fixed to said first driving member, each of said pivot means having a longitudinal axis and said one shaft having a longitudial axis, the longitudinal axis of each of said pivot means and said longitudinal axis of said one shaft being in a common plane, the three planes containing said longitudinal axis of said one shaft and the respective longitudinal axes of said pivot means forming three substantially equal included angles; a substantially spherical coupling member rotatively and slidably mounted on each of said pivot means; a second driving member rigidly associated with the other of said two shafts, said second member including three pairs of grooves, for engaging respective ones of said coupling members for rolling and sliding movement therein; each pair of grooves having two oppositely disposed wall surfaces, each wall surface in cross section being substantially an arc of a circle, and defining first and second open segments, one of said two segments receiving a respective one of said pivot means and the second of said segments communicating with a spacing, said two segments being oppositely disposed and extending along at least a substantial portion of the length of each of said pairs of grooves, said first segment facing outwardly and said second segment facing the interior of said joint.

2. The universal joint of claim 1, in which the thickness of at least that part of the second driving member carrying the grooves is substantially equal to the depth of said grooves.

3. The universal joint of claim 1, said grooves having generator lines forming arcs of a circle; said first driving member partly surrounding said second driving member whereby said pivot means enter said pairs of grooves through said first segment; and said axes of said pivot means being oblique to said one shaft.

4. The universal joint of claim 1, in which said grooves have rectilinear generator lines perpendicular to said other shaft.

5. The universal joint of claim 1, in which said grooves have generator lines forming arcs of a circle.

6. The universal joint of claim 1, in which the axes of said pivots are parallel to the axis of said one shaft.

7. The universal joint of claim 1, in which the axes of said pivots are oblique to the axis of said one shaft.

8. The universal joint of claim 1, in which the axes of said pivots are perpendicular to the axis of said one shaft.

9. The universal joint of claim 1, in which said spacing is a cavity in said second driving member.

10. The universal joint of claim 1, in which said spacing is located between said pairs of grooves and said first driving member.

11. The universal joint of claim 1, in which said pivot means enter said pairs of grooves through said second segment.

12. The universal joint of claim 1, said grooves having generator lines forming arcs of a circle; said pivot means radiating as spokes from said first driving member; and said one shaft being in rigid association with a member receiving the outer extremities of said pivot means.

13. The universal joint of claim 12, in which said second driving member carries means bearing on said first driving member for preventing the relative axial movement of said two shafts.

14. The universal joint of claim 1, said grooves having rectilinear generator lines; said one shaft being in rigid association with means for receiving the outer extremities of said pivot means, whereby said one shaft is coupled to said pivot means.

15. The universal joint of claim 14, in which said second driving member carries means bearing on said first driving member for preventing the relative axial movement of said two shafts.

16. The universal joint of claim 1, in which said grooves have rectilinear generator lines.

17. The universal joint of claim 16, in which said generator lines are parallel to the axis of said other shaft.

18. The universal joint of claim 16, in which said generator lines are oblique to the axis of said other shaft.

References Cited in the file of this patent

UNITED STATES PATENTS

| | | |
|---|---|---|
| 901,080 | Dock | Oct. 13, 1908 |
| 972,270 | Smith | Oct. 11, 1910 |
| 990,627 | Bogant | Apr. 25, 1911 |
| 2,125,615 | Kittredge | Aug. 2, 1938 |
| 2,235,002 | Anderson | Mar. 18, 1941 |
| 2,617,277 | Sindelar | Nov. 11, 1952 |
| 2,897,663 | Anderson | Aug. 4, 1959 |
| 2,910,845 | Wahlmark | Nov. 3, 1959 |